United States Patent
Jang et al.

(10) Patent No.: US 10,759,292 B2
(45) Date of Patent: Sep. 1, 2020

(54) VEHICLE CHARGING APPARATUS, CURRENT STABILIZATION METHOD THEREOF, AND RECORDING MEDIUM FOR RECORDING PROGRAM FOR IMPLEMENTING THE METHOD

(71) Applicants: Hyundai Motor Company, Seoul (KR); Kia Motors Corporation, Seoul (KR)

(72) Inventors: Hui Sung Jang, Suwon-si (KR); Gyu Tae Choi, Suwon-si (KR); Gi Bong Son, Hwaseong-si (KR); Hyun Wook Seong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 412 days.

(21) Appl. No.: 15/838,785

(22) Filed: Dec. 12, 2017

(65) Prior Publication Data
US 2019/0084439 A1     Mar. 21, 2019

(30) Foreign Application Priority Data

Sep. 21, 2017 (KR) .................. 10-2017-0121791

(51) Int. Cl.
*B60L 53/20*     (2019.01)
*H02M 1/42*     (2007.01)
(Continued)

(52) U.S. Cl.
CPC .............. *B60L 53/20* (2019.02); *B60L 53/16* (2019.02); *B60L 58/12* (2019.02); *H02J 7/0029* (2013.01);
(Continued)

(58) Field of Classification Search
CPC .......... B60L 53/20; B60L 53/16; B60L 58/12; H02J 7/02; H02J 7/0029; H02J 7/045; H02J 7/0071; H02J 7/027; H02J 2207/20; H02M 1/32; H02M 1/4208; H02M 1/42; H02M 2001/0003
(Continued)

(56) References Cited

U.S. PATENT DOCUMENTS 7,595,619 B2 *   9/2009   Vieira Formenti ....... H02J 7/04
                                                                                          323/282
7,990,740 B1 *   8/2011   Notohamiprodjo .........................
                                                                      H02M 1/4225
                                                                      363/59
(Continued)

FOREIGN PATENT DOCUMENTS

JP      2013034349 A   *   2/2013

*Primary Examiner* — Richard Isla
*Assistant Examiner* — Manuel Hernandez
(74) *Attorney, Agent, or Firm* — Morgan, Lewis & Bockius LLP (57) ABSTRACT

A current stabilization method performed by a vehicle charging apparatus, which includes a power factor corrector for correcting a power factor of an alternating current (AC) power source, vehicle charging apparatus converting an AC voltage of the AC power source into a direct current (DC) voltage to charge a vehicle battery, may include downwardly-adjusting a current control bandwidth of the power factor corrector when the adjusting of the current control bandwidth of the power factor corrector is requested.

13 Claims, 8 Drawing Sheets

(51) Int. Cl.
*B60L 53/16* (2019.01)
*B60L 58/12* (2019.01)
*H02M 1/32* (2007.01)
*H02J 7/00* (2006.01)
*H02J 7/02* (2016.01)
*H02J 7/04* (2006.01)
*H02M 1/00* (2006.01)

(52) U.S. Cl.
CPC ............... *H02J 7/02* (2013.01); *H02J 7/045* (2013.01); *H02M 1/32* (2013.01); *H02M 1/4208* (2013.01); *H02J 2207/20* (2020.01); *H02M 2001/0003* (2013.01)

(58) Field of Classification Search
USPC ......................................................... 320/109
See application file for complete search history.

(56) References Cited

U.S. PATENT DOCUMENTS

| | | | | |
|---|---|---|---|---|
| 10,291,053 | B1* | 5/2019 | Ho | H02J 7/007184 |
| 2011/0254511 | A1* | 10/2011 | Tam | H02J 7/045 |
| | | | | 320/162 |
| 2013/0063112 | A1* | 3/2013 | Yang | H02M 1/32 |
| | | | | 323/282 |
| 2013/0063986 | A1* | 3/2013 | Yang | H02M 3/33507 |
| | | | | 363/21.17 |
| 2013/0141056 | A1* | 6/2013 | Yang | H02M 1/4225 |
| | | | | 323/205 |
| 2014/0211519 | A1* | 7/2014 | Hsu | H02M 1/4258 |
| | | | | 363/21.17 |
| 2017/0170745 | A1* | 6/2017 | Wu | H02M 1/42 |
| 2017/0349056 | A1* | 12/2017 | Jang | H02J 7/0026 |
| 2018/0131194 | A1* | 5/2018 | Woo | H02J 7/007 |
| 2019/0101967 | A1* | 4/2019 | Yuuki | G06F 1/3206 |
| 2019/0260287 | A1* | 8/2019 | Son | H02M 1/4208 |

* cited by examiner

VEHICLE CHARGING APPARATUS, CURRENT STABILIZATION METHOD THEREOF, AND RECORDING MEDIUM FOR RECORDING PROGRAM FOR IMPLEMENTING THE METHOD

CROSS-REFERENCE(S) TO RELATED APPLICATION(S)

The present application claims priority to Korea Application No. 10-2017-0121791, filed on Sep. 21, 2017, the entire contents of which is incorporated herein for all purposes by this reference.

BACKGROUND OF THE INVENTION

Field of the Invention

The present invention relates to a vehicle charging apparatus, a current stabilization method thereof, and a recording medium in which a program for implementing the method is recorded.

Description of Related Art

Eco-friendly vehicles include a hybrid electric vehicle (HEV), a plug-in HEV, an electric vehicle, a fuel cell vehicle, and the like. Thereamong, the plug-in HEV and the electric vehicle may be charged using a household power source. To the present end, these two types of vehicles are provided with an on-board battery charger (OBC).

Figure 1A:
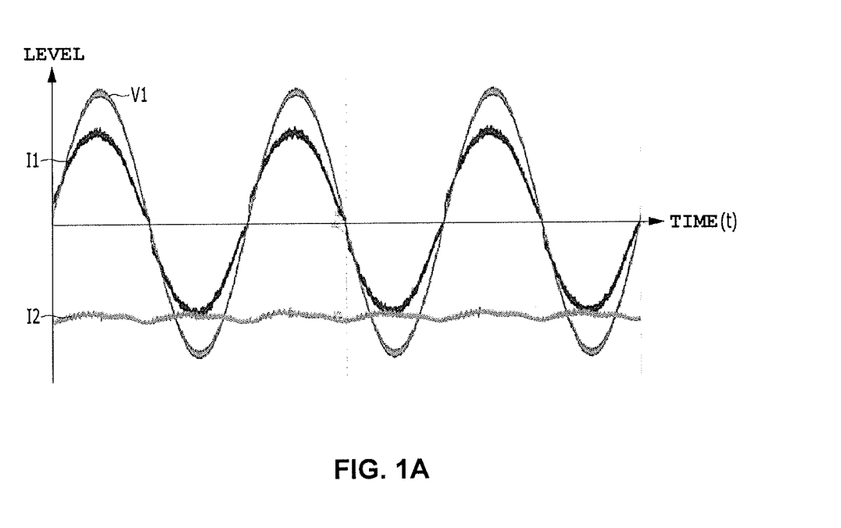
FIG. 1A is a graph illustrating stable currents and a stable voltage.
Figure 1B:
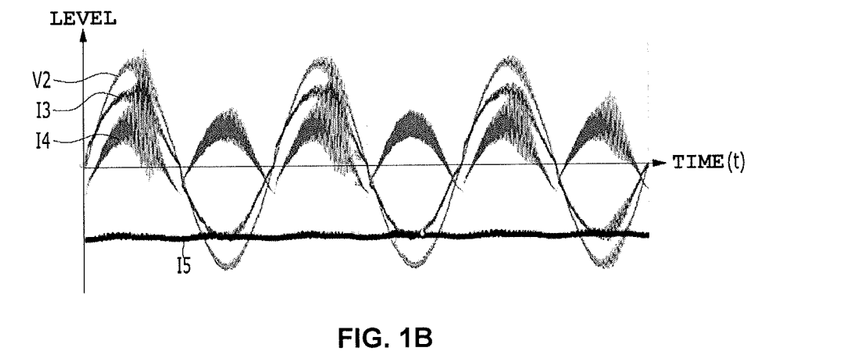
FIG. 1B is a graph illustrating unstable currents and an unstable voltage.

FIG. 1A is a graph illustrating stable currents I1 and I2 and a stable voltage V1, and FIG. 1B illustrates unstable currents I3, I4, and I5 and an unstable voltage V2. In each graph, the horizontal axis denotes elapsed time and the vertical axis denotes a level.

The OBC is a device configured for receiving electrical energy (e.g., an alternating current (AC) power source) from electric vehicle supply equipment (EVSE) of the electric vehicle and then charging a high-voltage battery through an in-cable control box (ICCB).

Since the OBC utilizes an AC power source, the OBS is significantly affected by a system environment and equipment. An AC current and voltage supplied to the OBC by a system impedance of a country and a specific region may not be stable, as opposed to FIG. 1A, and may be unstable as illustrated in FIG. 1B. The AC current and voltage may become unstable in an abnormal charging environment, for example, poor connection of a charging connector, damage of an AC input power source system, an instantaneous shutdown situation including an accident, or a charging environment in an area where stability of the AC input power source system is somewhat low. When an AC input power source is instantaneously shut down, instantaneous shutdown of EVSE of the AC input power source during recharging of a battery by the OBC may generate at least one of overcurrent or overvoltage in an internal of a circuit of a power factor corrector (PFC) disposed within the OBC, damaging the OBC or deteriorating charging efficiency of the OBC.

To solve the provided problem, a method of changing an input filter disposed within the OBC has been provided. However, the provided method causes increase in manufacturing costs and reduction in efficiency.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

Various aspects of the present invention are directed to providing a vehicle charging apparatus, a current stabilization method thereof, and a recoding medium in which a program for implementing the method is recorded, that substantially obviates one or more problems due to limitations and disadvantages of the related art.

An aspect of various exemplary embodiments are directed to providing a vehicle charging apparatus having stable current control performance, a current stabilization method thereof, and a recoding medium in which a program for implementing the method is recorded.

In an exemplary embodiment of the present invention, a current stabilization method performed by a vehicle charging apparatus, which may include a power factor corrector for correcting a power factor of an alternating current (AC) power source, the vehicle charging apparatus converting an AC voltage of the AC power source into a direct current (DC) voltage to charge a vehicle battery, may include downwardly-adjusting a current control bandwidth of the power factor corrector when the current control bandwidth of the power factor corrector needs to be adjusted.

For example, the current stabilization method may further include determining whether the current control bandwidth of the power factor corrector needs to be adjusted, and operating the power factor corrector using the downwardly-adjusted current control bandwidth.

For example, the determining may include determining whether overcurrent has occurred in the power factor corrector, determining a number of occurrences of overcurrent, and determining whether the determined number of occurrences of overcurrent is equal to or greater than a first predetermined number of occurrences, wherein, when the determined number of occurrences of overcurrent is equal to or greater than the first predetermined number of occurrences, the current control bandwidth may be downwardly-adjusted.

For example, the determining of whether the current control bandwidth of the power factor corrector needs to be adjusted may further include determining whether the determined number of occurrences of overcurrent is equal to or greater than a second predetermined number of occurrences when the determined number of occurrences of overcurrent is equal to or greater than the first predetermined number of occurrences, the current control bandwidth being downwardly-adjusted when the determined number of occurrences of overcurrent is less than the second predetermined number of occurrences, and wherein the second predetermined number of occurrences may be greater than the first predetermined number of occurrences.

For example, the current stabilization method may further include stopping an operation of the power factor corrector and initializing the current control bandwidth, when the determined number of occurrences of overcurrent is equal to or greater than the second predetermined number of occurrences.

For example, the current stabilization method may further include determining whether charging of the vehicle battery is complete, and stopping an operation of the power factor corrector and initializing the current control bandwidth when charging of the battery is completed.

For example, the downwardly-adjusting the current control bandwidth may include downwardly-adjusting the current control bandwidth using the determined number of occurrences of overcurrent as follows:

$$ABW=IBW-(C1-X+1)\cdot\alpha$$

wherein ABW denotes the downwardly-adjusted current control bandwidth, IBW denotes an initial current control bandwidth, C1 denotes the determined number of occurrences of overcurrent, X denotes the first predetermined number of occurrences, and α denotes the amount of downward adjustment of the current control bandwidth.

For example, the determining of whether the current control bandwidth of the power factor corrector needs to be adjusted may further include determine a duration in which overcurrent does not occur after overcurrent has occurred, and reducing the determined number of occurrences of overcurrent when the duration is equal to or greater than a predetermined duration.

For example, the downwardly-adjusting the current control bandwidth may include downwardly-adjusting the current control bandwidth using the determined number of occurrences of overcurrent as follows, when the determined number of occurrences of overcurrent is reduced:

$$ABW=IBW-(CM-X+1)\cdot\alpha$$

wherein ABW denotes the downwardly-adjusted current control bandwidth, IBW denotes an initial current control bandwidth, CM denotes a maximum value of the determined number of occurrences of overcurrent, X denotes the first predetermined number of occurrences, and a is the amount of downwardly-adjustment of the current control bandwidth.

For example, the operating the power factor corrector may include determining whether a current control bandwidth of the power factor corrector at a timing when overcurrent occurs is less than the downwardly-adjusted current control bandwidth, operating the power factor corrector in the current control bandwidth of a present timing when the current control bandwidth of the present timing is less than the downwardly-adjusted current control bandwidth, the current control bandwidth of the present timing corresponding to the current control bandwidth of the power factor corrector at a timing when the overcurrent occurs, and operating the power factor corrector in the downwardly-adjusted current control bandwidth when the downwardly-adjusted current control bandwidth is equal to or less than the current control bandwidth of the present timing.

For example, α may be 10 Hz to 2000 Hz.

In another exemplary embodiment of the present invention, a vehicle charging apparatus configured for converting an alternating current (AC) voltage of an AC power source into a direct current (DC) voltage and charging a vehicle battery may include an input filter configured to filter the AC voltage supplied from the AC power source and output the filtered result, a rectifier configured to rectify the filtered result and output the rectified result as a first DC voltage, a power factor corrector configured to correct a power factor of the charging apparatus using the first DC voltage in response to a first control signal and output the power factor corrected result as a second DC voltage, a level converter configured to convert a level of the second DC voltage in response to a second control signal and output the level-converted DC voltage to the battery, and a controller configured to determine whether a current control bandwidth of the power factor corrector needs to be adjusted, downwardly-adjust the current control bandwidth of the power factor corrector in response to the determined result, generate the first control signal corresponding to the downwardly-adjusted current control bandwidth, and generate the second control signal to control the level converter.

For example, the controller may include a first controller configured to generate the first control signal and a second controller configured to generate the second control signal.

For example, the first controller may include an adjustment determiner configured to determine whether the current control bandwidth of the power factor corrector needs to be adjusted, a bandwidth adjuster configured to downwardly-adjust the current control bandwidth of the power factor corrector in response to a determined result, and an operation controller configured to generate the first control signal corresponding to the downwardly-adjusted current control bandwidth.

For example, the adjustment determiner may include a detector configured to detect whether overcurrent has occurred in the power factor corrector, a number-of-occurrences counter configured to determine the number of occurrences of overcurrent according to a detected result in the detector, and a first comparator configured to compare the number of occurrences of overcurrent determined in the number-of-occurrences counter with a first predetermined number of occurrences, wherein the bandwidth adjuster may downwardly-adjust the current control bandwidth in response to the compared result in the first comparator.

For example, the adjustment determiner may further include a second comparator configured to compare the determined number of occurrences of overcurrent in the number-of-occurrences counter with a second predetermined number of occurrences in response to the compared result in the first comparator, wherein the second predetermined number of occurrences may be greater than the first predetermined number of occurrences, wherein the bandwidth adjuster may downwardly-adjust the current control bandwidth in response to the compared results in the first and second comparators, and wherein the operation controller may be configured to generate the first control signal in response to the compared result in the second comparator.

For example, the adjustment determiner may further include a duration counter configured to count a duration in which overcurrent does not occur after overcurrent has occurred through the detected result in the detector, and a third comparator configured to compare the duration counted in the duration counter with a predetermined duration, and wherein the number-of-occurrences counter may reduce the determined number of occurrences of overcurrent in response to the compared result in the third comparator.

For example, the bandwidth adjuster may downwardly-adjust the current control bandwidth using one of the following two equations in response to the compared results in the first to third comparators:

$$ABW=IBW-(C1-X+1)\cdot\alpha$$

or $$ABW=IBW-(CM-X+1)\cdot\alpha$$

wherein ABW denotes the downwardly-adjusted current control bandwidth, IBW denotes an initial current control bandwidth, C1 denotes the determined number of occurrences of overcurrent in the number-of-occurrences counter, CM denotes a maximum value of the determined number of occurrences of overcurrent in the number-of-occurrence counter, X denotes the first predetermined number of occurrences, and α denotes the amount of downward adjustment of the current control bandwidth.

In various exemplary embodiments, a computer-readable recording medium records a program for implementing a current stabilization method performed by a vehicle charging apparatus, which may include a power factor corrector for correcting a power factor of an alternating current (AC) power source, the vehicle charging apparatus converting an AC voltage of the AC power source into a direct current (DC) voltage to charge a vehicle battery, wherein the program implements a function of downwardly-adjusting a current control bandwidth of the power factor corrector when the current control bandwidth of the power factor corrector needs to be adjusted.

The program may further implement a function of determining whether the current control bandwidth of the power factor corrector needs to be adjusted, and a function of operating the power factor corrector using the downwardly-adjusted current control bandwidth.

The methods and apparatus of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined in the appended claims.

Furthermore, as used herein, relational terms, including "first", "second", "on"/"upper"/"above", "under"/"lower"/"below," and the like, are used solely to distinguish one entity or element from another entity or element without necessarily requiring or implying any physical or logical relationship or order between such entities or elements.

Hereinafter, a construction and operation of a vehicle charging apparatus 100 according to an exemplary embodiment will be described with reference to the accompanying drawings.

Figure 2:
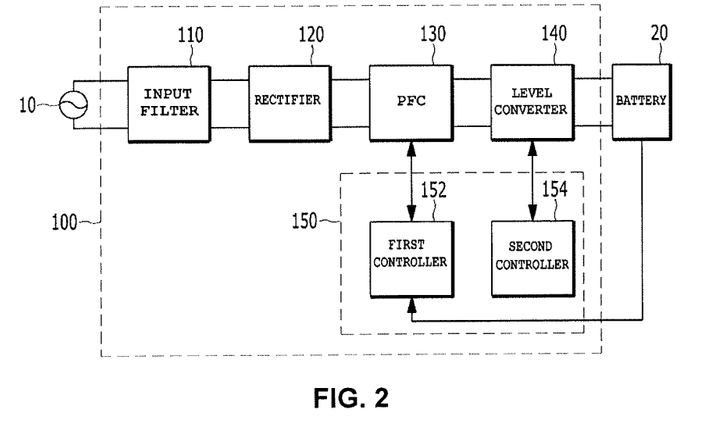
FIG. 2 is a block diagram of a vehicle charging apparatus according to an exemplary embodiment of the present invention.

FIG. 2 is a block diagram of the vehicle charging apparatus 100 according to an exemplary embodiment.

The vehicle charging apparatus 100 is connected between an AC power source 10 and a vehicle battery 20 and converts an AC voltage supplied from the AC power source 10 into a direct current (DC) voltage to charge the battery 20. The charging apparatus 100 of FIG. 2 may be a type of an on-board battery charger (OBC) but the present invention and exemplary embodiments are not limited thereto. The battery 20 is configured to provide driving power to a vehicle.

Herein, the AC power source 10 may be an external power source to a vehicle, for example, a household power source.

The vehicle charging apparatus 100 may include an input filter 110, a rectifier 120, a power factor corrector (PFC) 130, a level converter 140, and a controller 150.

The input filter 110 filters the AC voltage supplied from the AC power source 10 and outputs the filtered result to the rectifier 120. Since the input filter 110 filters the AC voltage, conductive noise and radiative noise included in the AC voltage may be cancelled or reduced.

A converter, which converts AC power into DC power through switching, may include the input filter 110 as illustrated in FIG. 2. Although the input filter 110 is disposed at an input side of the charging apparatus 100 in FIG. 2, the present invention is not limited thereto. That is, according to various exemplary embodiments, the input filter 110 may be disposed at an output side of the charging apparatus 100.

The input filter 110 may be an electromagnetic interference (EMI) filter and may be implemented by at least one of an inductor or a capacitor.

The rectifier 120 rectifies a result filtered by the input filter 110 and outputs the rectified result to the PFC 130 as a first DC voltage. The rectifier 120 may be implemented by a circuit including diodes, for example, a full-wave rectification circuit including full-bridge diodes.

The PFC 130 is configured to correct a power factor of a power source. In more detail, the PFC 130 is configured to reduce power loss in a process of converting AC power into DC power. Accordingly, a power factor of an input voltage/current of the charging apparatus 100 may be corrected by the PFC 130. For example, the PFC 130 may increase transmission efficiency by eliminating a difference in phase between a voltage and a current of the AC power source, using an internal matching circuit.

The PFC 130 may perform or stop the above-described operation in response to a first control signal output from the controller 150. The PFC 130 corrects the power factor of the charging apparatus 100 using the first DC voltage output from the rectifier 120 and outputs the power factor corrected result to the level converter 140 as a second DC voltage.

The level converter 140 is connected between an output terminal of the PFC 130 and an input terminal of the battery 20. The level converter 140 converts the level of the second DC voltage in response to a second control signal output from the controller 150 and outputs the level-converted voltage to the battery 20. That is, the level converter 140 may boost or buck the second DC voltage output from the PFC 130 into a third DC voltage for charging the battery 20. For example, the level converter 140 may be implemented by an insulated DC-DC converter which adopts a switching circuit of a full-bridge or half-bridge type, however, the present invention is not limited thereto.

The controller 150 is configured to control the PFC 130 and the level converter 140. To the present end, the controller 150 may include first and second controllers 152 and 154. The first controller 152 is configured to generate the first control signal and transmit the first control signal to the PFC 130, and the second controller 154 is configured to generate the second control signal and transmit the second control signal to the level converter 140.

For example, when each of the PFC 130 and the level converter 140 is implemented by a pulse width modulation (PWM) driving circuit to perform the aforementioned functions, the first and second control signals may be gate signals of a PWM scheme. The PFC 130 may perform or stop an operation in response to the first control signal. For example, the operation of the PFC 130 may be stopped by cutting off a current or a voltage supplied to the PFC 130 by the first control signal. Similarly, the level converter 140 may perform or stop the operation in response to the second control signal.

Meanwhile, in controlling current, the above-described charging apparatus 100 may become unstable due to the input filter 110. Among converters, an OBC charges the battery 20 using an external power source system, and thus the charging apparatus 100 may be affected by various factors including an environment and a region. For example, control of the charging apparatus 100 may become unstable due to system impedance, which may cause customer complaints regarding an inability to charge. For example, causes of unstable control of the charging apparatus 100 may include an environmental factor including an input voltage/current, internal elements of the input filter 110, and a control transfer function.

Prior to a description of a current stabilization method for stably controlling an unstable current according to an exemplary embodiment of the present invention, a theoretical background will now be explained below.

Figure 3:
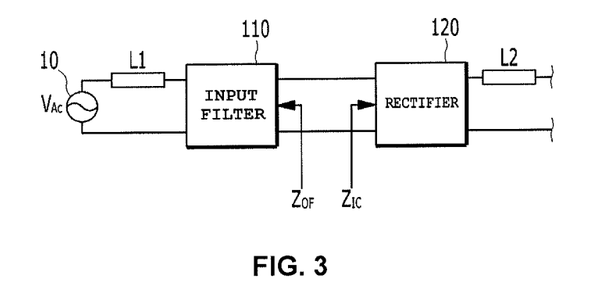
FIG. 3 is a block diagram partially illustrating the charging apparatus of FIG. 2.

FIG. 3 is a block diagram partially illustrating the charging apparatus 100 of FIG. 2.

An AC power source 10, an input filter 110, and a rectifier 120 illustrated in FIG. 3 respectively correspond to the AC power source 10, the input filter 110, and rectifier 120 illustrated in FIG. 2. Therefore, the same reference numerals are used and a repetitive description is omitted. In FIG. 3, L1 corresponds to a first load between the AC power source 10 and the input filter 110 and L2 corresponds to a second load of constituent elements disposed subsequent the rectifier 120 output.

An output impedance $Z_{OF}$ of the input filter 110 shown in FIG. 3 may increase by the first load L1. Herein, when the output impedance $Z_{OF}$ of the input filter 110 is greater than an input impedance $Z_{IC}$ of the charging apparatus 100, current control may become unstable.

An input admittance $Y_{IC}$ of the charging apparatus 100 is a reciprocal of the input impedance $Z_{IC}$ of the charging apparatus 100 and may be expressed as Equation 1.

$$Y_{IC}(s) = \frac{I_{bs\_ref}}{V_{ACRMS}} \times \frac{G_{ci}}{(sL + G_{ci})} = \frac{I_{bs\_ref}}{V_{ACRMS}} \times \frac{1}{(sL/G_{ci} + 1)} \quad \text{[Equation 1]}$$

Herein, $I_{bs\_ref}$ denotes a root mean square (RMS) of an AC current supplied from the AC power source 10, $V_{ACRMS}$ denotes an RMS of an AC voltage supplied from the AC power source 10, L denotes an inductance of the PFC 130, and $G_{ci}$ denotes a current control transfer function of the PFC 130.

In Equation 1, $I_{bs\_ref}/V_{ACRMS}$ is a fixed value and is invariable, whereas L and $G_{ci}$ may be variable.

To stabilize current control of the charging apparatus 100, the output impedance $Z_{OF}$ of the input filter 110 needs to be decreased and the input impedance $Z_{IC}$ of the charging apparatus 100 needs to be increased. That is, it is necessary to decrease the input admittance $Y_{IC}$ of the charging apparatus 100 indicated in the above Equation 1.

First, to decrease the output impedance $Z_{OF}$, a circuit configuration of the input filter 110 may be modified. That is, an X-capacitance and inductance of the input filter 110 may be modified and a damping resistor may be added.

Furthermore, to increase the input impedance $Z_{IC}$ of the charging apparatus 100, i.e., to decrease the input admittance $Y_{IC}$ of the charging apparatus 100, the inductance of the PFC 130 needs to be increased or a current control bandwidth (or response performance) in the current control transfer function $G_{ci}$ needs to be lowered.

Hereinafter, a current stabilization method 200 according to an exemplary embodiment of the present invention, for stabilizing current of the charging apparatus 100 by the first controller 152 of the controller 150 illustrated in FIG. 2, will be described with reference to FIG. 4, FIG. 6, FIG. 8, and FIG. 9. While the current stabilization method 200 illustrated in FIG. 4, FIG. 6, FIG. 8, and FIG. 9 is referred to as being performed by the first controller 152 illustrated in FIG. 5 and FIG. 7, the present invention is not limited thereto. In other words, the current stabilization method 200 according to an exemplary embodiment of the present invention may also be performed by the first controller 152 having a configuration different from configurations illustrated in FIG. 5 and FIG. 7. Alternatively, the current stabilization method 200 illustrated in FIG. 4, FIG. 6, FIG. 8, and FIG. 9 may be performed through a program by the first controller 152.

Figure 4:
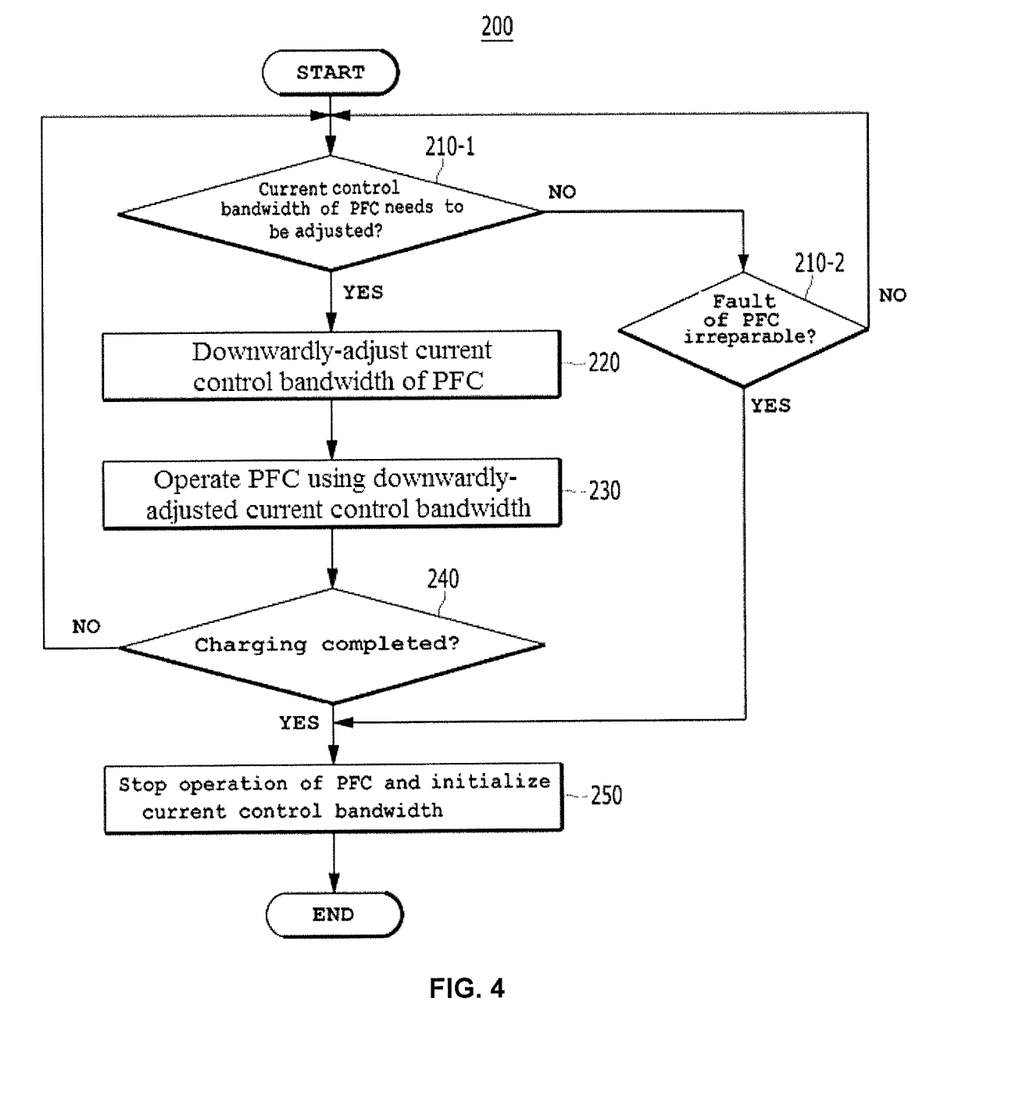
FIG. 4 is a flowchart for explaining a current stabilization method according to an exemplary embodiment of the present invention.

FIG. 4 is a flowchart for explaining the current stabilization method 200 according to an exemplary embodiment.

Figure 5:
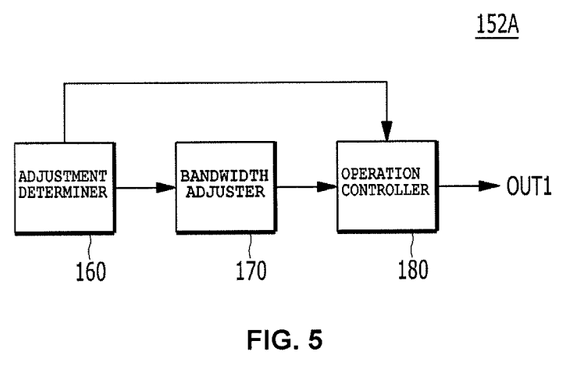
FIG. 5 is a block diagram of a first controller according to an exemplary embodiment for performing the current stabilization method of FIG. 4.

FIG. 5 is a block diagram of a first controller 152A according to an exemplary embodiment for performing the current stabilization method 200 of FIG. 4. The first controller 152A may include an adjustment determiner 160, a bandwidth adjuster 170, and an operation controller 180.

The first controller 152A of FIG. 5 corresponds to an exemplary embodiment of the first controller 152 illustrated in FIG. 2 and performs the same role as the first controller 152. In more detail, the first controller 152A is configured to determine whether a current control bandwidth of the PFC 130 needs to be adjusted. The first controller 152A is configured to downwardly-adjust the current control bandwidth of the PFC 130 in response to the determined result, generates a first control signal corresponding to the downwardly-adjusted current control bandwidth, and outputs the first control signal to the PFC 130 (steps 210-1 and 210-2 to 250). The operation of the first controller 152A will now be described more specifically with reference to FIG. 4 and FIG. 5.

The adjustment determiner 160 determines whether the current control bandwidth of the PFC 130 needs to be adjusted (210-1). When it is determined that the current control bandwidth of the PFC 130 need not to be adjusted, the adjustment determiner 160 determines whether a fault of the PFC 130 is irreparable (210-2). Herein, a case in which the current control bandwidth of the PFC 130 needs not to be adjusted may be the case in which it is too early to adjust the current control bandwidth of the PFC 130 or a case in which the fault of the PFC 130 is irreparable. Accordingly, the adjustment determiner 160 performs step 210-2 to determine which case corresponds to the case in which adjustment of the current control bandwidth is not needed.

Hereinafter, an exemplary embodiment 210A of steps 210-1 and 210-2 and an exemplary embodiment 160A of the adjustment determiner 160 will be described.

Figure 6:
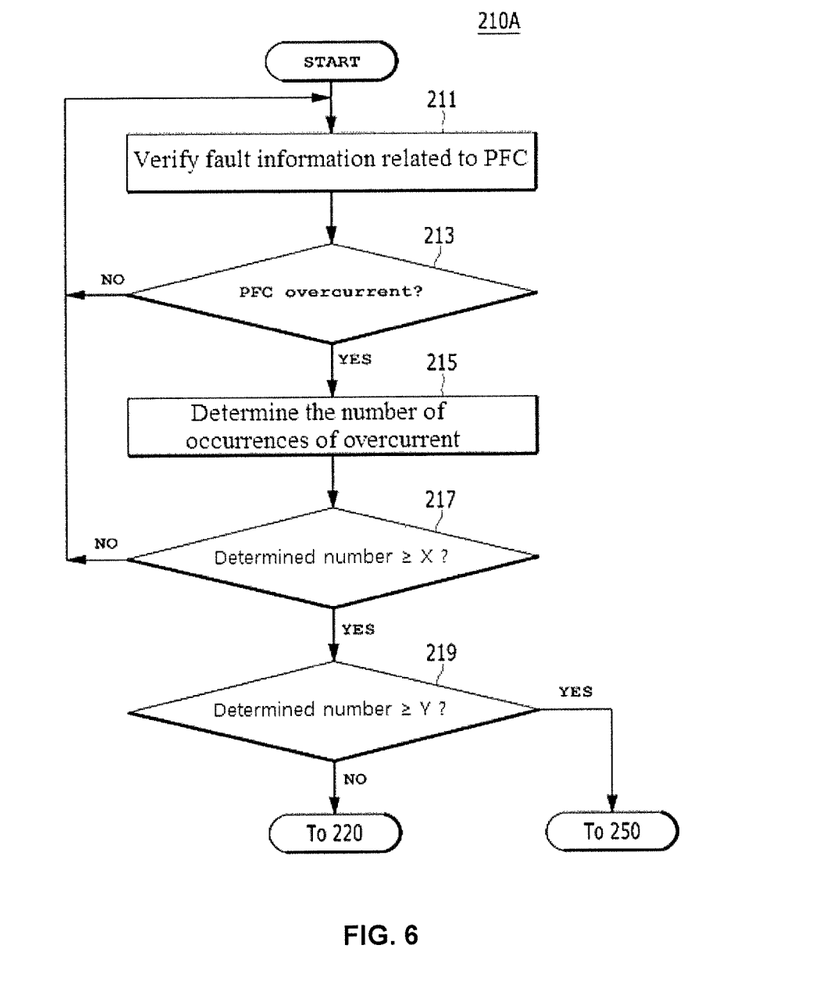
FIG. 6 is a flowchart for explaining an exemplary embodiment of steps 210-1 and 210-2 as illustrated in FIG. 4.

FIG. 6 is a flowchart for explaining the exemplary embodiment 210A of steps 210-1 and 210-2 illustrated in FIG. 4.

Figure 7:
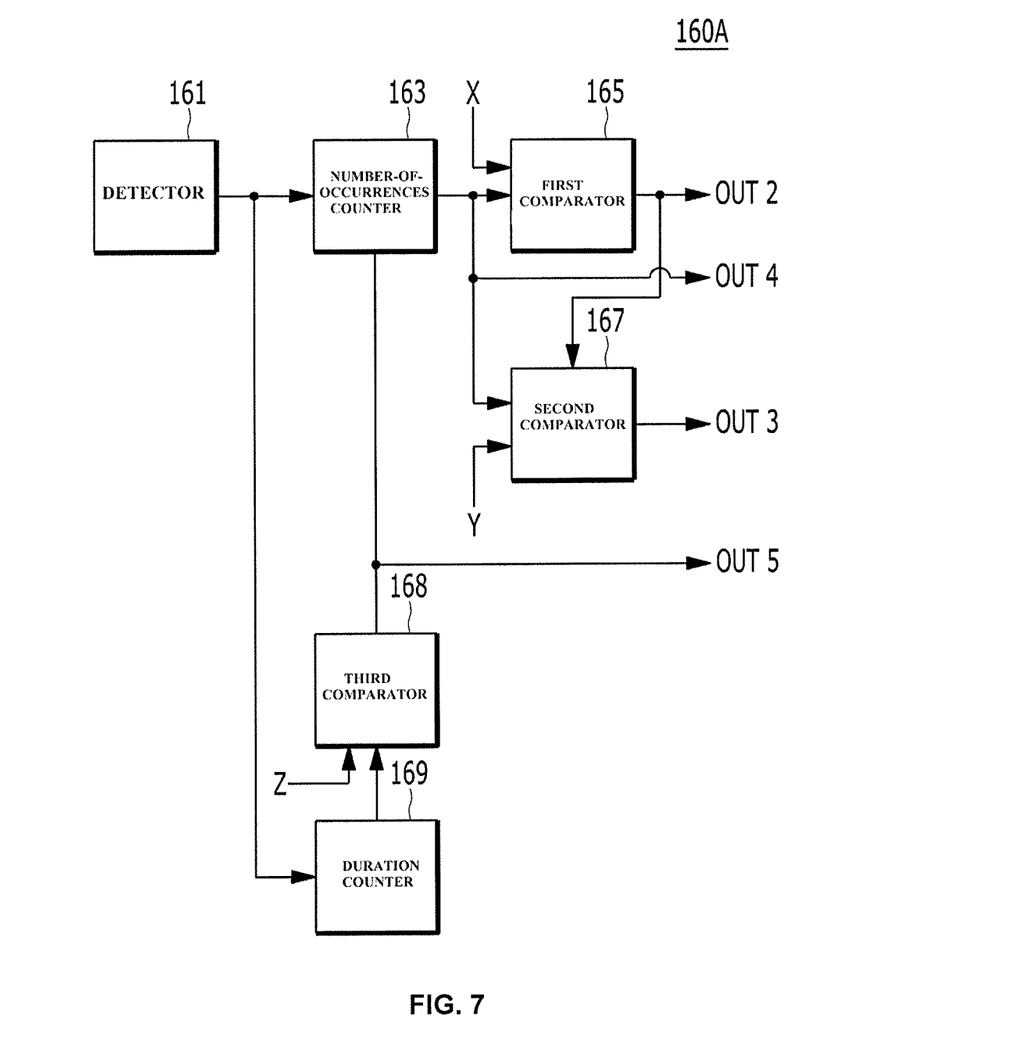
FIG. 7 is a block diagram of an exemplary embodiment of an adjustment determiner as illustrated in FIG. 5.

FIG. 7 is a block diagram of the exemplary embodiment 160A of the adjustment determiner 160 illustrated in FIG. 5. The adjustment determiner 160A may include a detector 161, a number-of-occurrences counter 163, a first comparator 165, and a second comparator 167.

The first controller 152 is configured to verify fault information related to the PFC 130 (211). The fault information related to the PFC 130 may be diverse. When the fault information includes only information as to whether or not overcurrent (or overvoltage) has occurred from the PFC 130, step 211 may be omitted. For example, when a voltage including a spike is instantaneously generated from the AC power source 10, since an AC voltage is higher than a DC link voltage, overcurrent may occur. However, the present invention is not limited to a specific situation in which overcurrent occurs.

After step 211, the detector 161 detects whether overcurrent has occurred from the PFC 130 and outputs the detected result to the number-of-occurrences counter 163 and a duration counter 169 (213).

As illustrated in FIG. 7, the detector 161 may be included in each of the first controllers 152 and 152A but the present invention is not limited thereto. According to various exemplary embodiments, the detector 161 may not be included in each of the first controllers 152 and 152A and may be included in the PFC 130.

After step 213, the number-of-occurrences counter 163 determines the number of occurrences of overcurrent in the PFC 130 using the result detected by the detector 161 and outputs the determined result to the first and second comparators 165 and 167. The number-of-times counter 163 also outputs the determined result to the bandwidth adjuster 170 through an output terminal OUT4 (215).

After step 215, the first comparator 165 compares the determined number in the number-of-occurrences counter 163 with a first number of occurrences X and outputs the compared result to the bandwidth adjuster 170 through an output terminal OUT2 (217). That is, the first comparator 165 performs a comparison operation to determine whether the determined number in the number-of-occurrences counter 163 is equal to or greater than the first number of occurrences X. When it is detected that the determined number in the number-of-occurrences counter 163 is not equal to or greater than the first number of occurrences X as the result of comparison in the first comparator 165, the detector 161 of the adjustment determiner 160 continues to perform step 211 and the bandwidth adjuster 170 does not perform step 220.

Step 220 is not performed immediately upon occurrence of overcurrent in PFC 130, and step 217 is performed to perform step 220 only when the number of occurrences of overcurrent reaches the first number of occurrences X. Since step 217 is performed in the above manner, unnecessary downwardly-adjustment of the current control bandwidth may be avoided.

The second comparator 167 compares the compared result in the number-of-occurrences counter 163 with a second number of occurrences Y in response to the compared result in the first comparator 165 and outputs the compared result to the bandwidth adjuster 170 through an output terminal OUT3 (219). That is, the second comparator 167 performs a comparison operation to determine whether the determined number in the number-of-occurrences counter 163 is equal to or greater than the second number of occurrences Y. In the present case, the second comparator 167 may perform step 219 only upon determining that the determined number in the number-of-occurrences counter 163 is equal to or greater than the first number of occurrences X through the compared result in the first comparator 165.

The second number of occurrences Y may be greater than the first number of occurrences X. When the current control bandwidth continues to be lowered, since a power factor and a threshold of a voltage output to the battery 20 from the charging apparatus 100 may be lowered, the first number of occurrences X and the second number of occurrences Y may be determined in consideration of the power factor and the threshold. For example, the first number of occurrences X may be 1 to 5, desirably 3, and the second number of occurrences Y may be 5 to 20, desirably, 10, but the present invention is not limited thereto.

Referring back to FIG. 4 and FIG. 5, upon recognizing that the current control bandwidth of the PFC 130 needs to be adjusted in response to the determined result in the adjustment determiner 160, the bandwidth adjuster 170 downwardly-adjusts the current control bandwidth of the PFC 130 and outputs the adjusted result to the operation controller 180 (220).

In other words, upon recognizing that the determined result in the number-of-occurrences counter 163 is less than the second number of occurrences Y through the compared result in the second comparator 167 after recognizing that the determined result in the number-of-occurrences counter 163 is equal to or greater than the first number of occurrences X through the compared result in the first comparator 165, the bandwidth adjuster 170 may downwardly-adjust the current control bandwidth using the result output through the output terminal OUT4 from the number-of-occurrences counter 163.

In the present way, the bandwidth adjuster 170 may downwardly-adjust the current control bandwidth in response to the compared results in the first and second comparators 165 and 167.

For example, the bandwidth adjuster 170 may downwardly-adjust the current control bandwidth using the determined number which is counted by the number-of-occurrences counter 163 and is output through the output terminal OUT4, as indicated by Equation 2.

$$ABW = IBW - (C1 - X + 1) \cdot \alpha \qquad \text{[Equation 2]}$$

Herein, ABW denotes a downwardly-adjusted current control bandwidth, IBW denotes an initial current control bandwidth, C1 denotes the determines number in the number-of-occurrences counter 163, X denotes the first number of occurrences, and α denotes the amount of downward adjustment of the current control bandwidth. For example, when IBW is 2.2 kHz, C1 is 5, X is 3, and α is 100 Hz, then ABW may be 1.9 kHz. That is, the current control bandwidth may be downwardly-adjusted from 2.2 kHz to 1.9 kHz.

Figure 8:
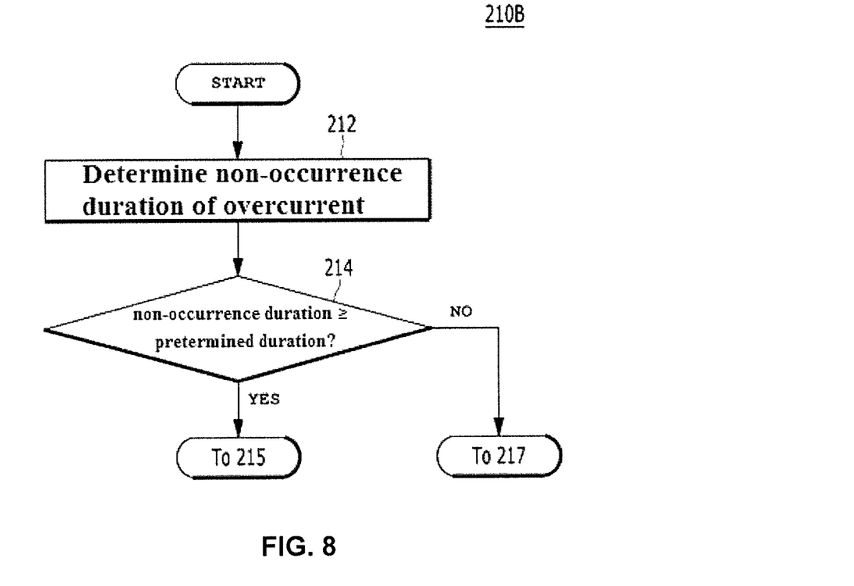
FIG. 8 is a flowchart for explaining another exemplary embodiment of step 210-1 as illustrated in FIG. 4.

FIG. 8 is a flowchart for explaining another exemplary embodiment 210B of step 210-1 as illustrated in FIG. 4.

To perform the method 210B of FIG. 8, the adjustment determiner 160A of FIG. 7 may further include a third comparator 168 and a duration counter 169.

The duration counter 169 of the adjustment determiner 160A of FIG. 7 counts a duration in which overcurrent does not occur after overcurrent has occurred through the detected result in the detector 161 and outputs the counted result to the third comparator 168 212).

The third comparator 168 compares the counted duration in the duration counter 169 with a predetermined duration Z and outputs the compared result to the number-of-occurrences counter 163 and to the bandwidth adjuster 170 through an output terminal OUT5 (214). That is, the third comparator 168 performs a comparison operation to determine whether a duration in which overcurrent does not occur after overcurrent has occurred is equal to or greater than the predetermined duration Z. For example, the predetermined duration Z may be a few seconds to a few minutes, desirably, 30 seconds, but the present invention is not limited thereto.

Upon detecting that the duration in which overcurrent does not occur after overcurrent has occurred, the PFC 130 is equal to or greater than the predetermined duration Z through the compared result in the third comparator 168 and the number-of-occurrences counter 163 decreases the number of occurrences of overcurrent (215). When the number of occurrences of overcurrent is decreased, the current control bandwidth is increased again and then overcurrent may reoccur.

The exemplary embodiment 210B of FIG. 8 may be performed after step 215 and before step 217 as illustrated in FIG. 6.

When the adjustment determiner 160 does not perform the method of FIG. 8, the duration counter 169 and the third comparator 168 as illustrated in FIG. 7 are omitted, and the current control bandwidth is adjusted as indicated in Equation 2, described above.

However, when the adjustment determiner 160 performs the method of FIG. 8, the bandwidth adjuster 170 may downwardly-adjust the current control bandwidth in response to the compared result output from the third comparator 168 through the output terminal OUT5. That is, upon recognizing that the duration in which overcurrent does not occur after overcurrent has occurred in the PFC 130 is equal to or greater than the predetermined duration Z through the compared result in the third comparator 168 and it is recognized that the determined number in the number-of-occurrences counter 163 is greater than the first number of occurrences X and less than the second number of occurrences Y through the compared results in the first and second comparators 165 and 167, the bandwidth adjuster 170 may downwardly-adjust the current control bandwidth as indicated by Equation 3 using the determined number output from the number-of-occurrences counter 163 through the output terminal OUT4.

$$ABW=IBW-(CM-X+1)\cdot\alpha \qquad \text{[Equation 3]}$$

Herein, CM denotes a maximum value of the determined number in the number-of-occurrences counter 163.

As described above, the bandwidth adjuster 170 downwardly-adjusts the current control bandwidth as indicated by Equation 2 or 3 in response to the compared results in the first to third comparators 165, 167, and 168. For example, when IBW is 2.2 kHz, CM is 6, X is 3, and α is 100 Hz, then ABW may be 1.8 kHz. That is, the current control bandwidth may be downwardly-adjusted from 2.2 kHz to 1.8 kHz.

Even when the number of occurrences determined by the number-of-occurrences counter 163 is reduced in a same charging cycle, the current control bandwidth is downwardly-adjusted using CM instead of C1, as indicated by Equation 3.

Referring again to FIG. 4 and FIG. 5, after step 220, the operation controller 180 is configured to generate the first control signal corresponding to the current control bandwidth downwardly-adjusted by the bandwidth adjuster 170 and outputs the generated first control signal to the PFC 130 (230). Therefore, the PFC 130 may operate in the downwardly-adjusted current control bandwidth in response to the first control signal.

In the present case, the operation controller 180 is configured to generate the first control signal in response to the compared result in the second comparator 167. That is, upon recognizing that the determined result in the number-of-occurrences counter 163 is less than the second number of occurrences Y through the compared result in the second comparator 167, the operation controller 180 generates the first control signal in correspondence to the current control bandwidth downwardly-adjusted by the bandwidth adjuster 170. However, upon recognizing that the determined result in the number-of-occurrences counter 163 is equal to or greater than the second number of occurrences Y through the compared result in the second comparator 167, the operation controller 180 stops the operation of the PFC 130 using the first control signal.

Figure 9:
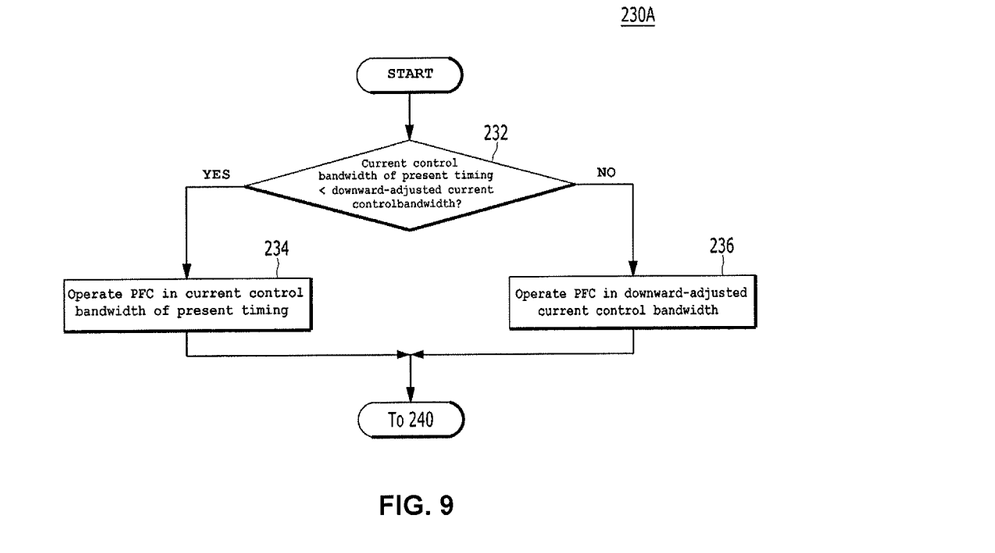
FIG. 9 is a flowchart for explaining an exemplary embodiment of step 230 as illustrated in FIG. 4.

FIG. 9 is a flowchart for explaining an exemplary embodiment 230A of step 230 illustrated in FIG. 4.

Referring to FIG. 9, the operation controller 180 is configured to determine whether a current control bandwidth (hereinafter, referred to as a current control bandwidth of a present timing) of the PFC 130 at a timing when overcurrent occurs is less than a current control bandwidth downwardly-adjusted by the bandwidth adjuster 170 (232).

When the current control bandwidth of the present timing is less than the downwardly-adjusted current control bandwidth, the operation controller 180 is configured to generate the first control signal for operating the PFC 130 in the current control bandwidth of the present timing and outputs the first control signal to the PFC 130 through the output terminal OUT1 (234).

However, when the downwardly-adjusted current control bandwidth is equal to or less than the current control bandwidth of the present timing, the operation controller 180 is configured to generate the first control signal for operating the PFC 130 in the current control bandwidth downwardly-adjusted by the bandwidth adjuster 170 and outputs the first control signal to the PFC 130 through the output terminal OUT1 (236).

Furthermore, upon recognizing that the determined number in the number-of-occurrence counter 163 is equal to or greater than the second number of occurrences Y through the compared result in the second comparator 167 of the adjustment determiner 160, the operation controller 180 may be configured to generate the first control signal for stopping the operation of the PFC 130 and outputs the first control signal to the PFC 130 through the output terminal OUT1 (250). In the present case, the first controller 152 may be configured to initialize the current control bandwidth (250). The reason for initializing the current control bandwidth is that control performance may be secured when an operation of recharging the battery 20 is resumed after the charging apparatus 100 stops a charging operation.

That is, although the PFC 130 is operated in the downwardly-adjusted current control bandwidth in step 220 when the number of occurrences of overcurrent in the PFC 130 is equal to or greater than the first number of occurrences X but is less than the second number of occurrences Y, when the number of occurrences of overcurrent in the PFC 130 reaches the second number of occurrences Y, the first controller 152 is configured to stop the operation of the PFC 130. When the operation of the PFC 130 is stopped, an operation of charging the battery 20 by the charging apparatus 100 is stopped. In the present case, the charging apparatus 100 according to an exemplary embodiment of the present invention may further include an alert device configured for alerting a user to necessity of hardware check.

Even when the number of occurrences of overcurrent in the PFC 130 is less than the second number of occurrences Y, when the downwardly-adjusted current control bandwidth in step 220 reaches a minimum value, the first controller 152 may be configured to stop the operation of the PFC 30. How fast the downwardly-adjusted current control bandwidth reaches the minimum value may be determined by adjusting the amount of downward adjustment a of the current control bandwidth. For example, a may be 10 Hz to 2000 Hz, desirably, 100 Hz, but the present invention is not limited thereto.

Referring back to FIG. 2 and FIG. 4, the first controller 152 may be configured to determine whether charging of the vehicle battery 20 is completed (240). To the present end, the first controller 152 is connected to the battery 20 and configured to determine whether the battery 20 has been charged.

When it is determined that charging of the battery 20 is not completed, the first controller 152 may be configured to continue to perform steps 210-1, 210-2, 220, and 230 as illustrated in FIG. 4. However, when it is recognized that the charging of the vehicle battery 20 is completed, the first controller 152 may be configured to generate the first control signal for stopping the operation of the PFC 130 to output the first control signal to the PFC 130 and initialize the current control bandwidth (250).

Figure 10A:
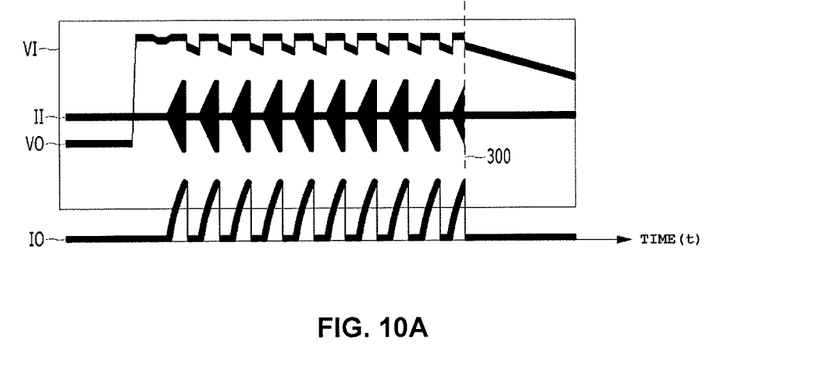
FIG. 10A and FIG. 10B are graphs for explaining operations of the charging apparatus according to a comparative example and an exemplary embodiment of the present invention, respectively.
Figure 10B:
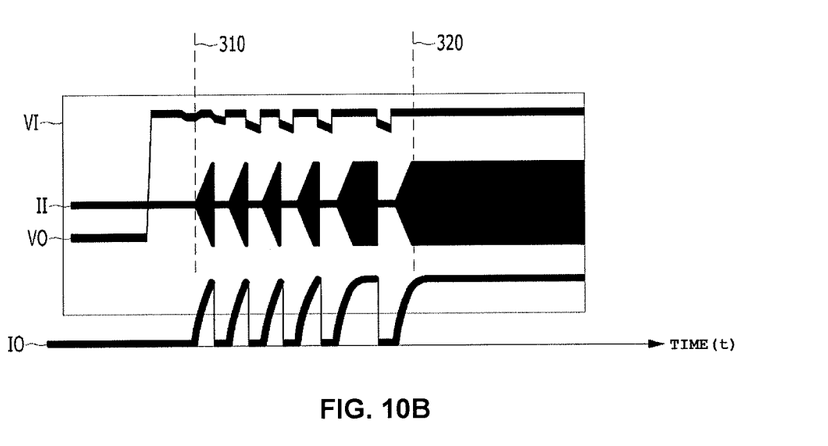

FIG. 10A and FIG. 10B are graphs for explaining operations of the charging apparatus according to a comparison example and an exemplary embodiment of the present invention, respectively, wherein a horizontal axis denotes elapsed time. Herein, VI and II denote an input voltage and an input current of the charging apparatus, respectively, and VO and IO denote an output voltage and an output current of the charging apparatus, respectively.

In the comparison example, when both step 217 in FIG. 6 is omitted and step 220 in FIG. 4 is omitted, when the number of occurrences of overcurrent in the PFC 130 is less than the second number of occurrences Y, the PFC 130 continues to be operated without changing the current control bandwidth in a state in which overcurrent has occurred in step 230. Next, when the number of occurrences of overcurrent in the PFC 130 is equal to the second number of occurrences Y, the operation of the PFC 130 is stopped at a timing 300, as illustrated in FIG. 10A. Next, in the same environment, the PFC 130 is operated again without taking measures to adjust the current control bandwidth so that charging is stopped due to continuous instability of the input current control.

Meanwhile, when charging of the battery 20 is impossible due to an unstable phenomenon of the input current control, the current stabilization method 200 according to the above-described exemplary embodiments sequentially lowers the current control bandwidth in step 220 at a timing 310, as illustrated in FIG. 10B, and operates the PFC 130 in the lowered current control bandwidth, being configured for continuously charging the battery 20 even at a timing 320, as illustrated in FIG. 10B.

Consequently, when input current control is unstable, the current stabilization method 200 according to the above-described exemplary embodiments secures current control stability through active measure of sequentially lowering the current control bandwidth by checking an external system environment and continuously charges the battery 20, increasing a charging success probability of the battery 20. Therefore, a situation in which the charging apparatus 100 stops charging the battery 20 and thus inconveniencing a user can be solved.

Furthermore, in the current stabilization method 200 according to the exemplary embodiment of the present invention, the first controller 152 is configured to perform the methods as illustrated in FIG. 4, FIG. 6, FIG. 7, FIG. 8, and FIG. 9 by software without changing the input filter 110 or without using additional elements so that the charging apparatus 100 is not changed and constituent elements are not added. Therefore, manufacturing costs of the charging apparatus 100 do not increase and does not deteriorate efficiency. As a result, since control stabilization of the vehicle charging apparatus 100 is secured, power source quality of a vehicle may be improved.

Furthermore, deterioration of a power factor and a threshold value may be prevented by properly determining the first number of occurrences X and the second number of occurrences Y.

The current stabilization method according to the above-described exemplary embodiments may also be implemented by a program recorded in a computer-readable recording medium.

In the recording medium in which a program for implementing the current stabilization method performed by the vehicle charging apparatus, which may include a power factor corrector for correcting the power factor of an AC power source and converts an AC voltage of the AC power source into a DC voltage to charge a vehicle battery, is recorded, the program which implements a function of downwardly-adjusting a current control bandwidth of the power factor corrector when the current control bandwidth of the power factor corrector needs to be adjusted is recorded in the recording medium. Furthermore, a computer may read the recording medium.

The program recorded in the computer-readable recording medium may further implement a function of determining whether the current control bandwidth of the power factor corrector needs to be adjusted and a function of operating the power factor corrector using the downwardly-adjusted current control bandwidth.

The computer-readable recording medium may include all types of storage devices storing data that may be read by a computer system. Examples of the computer-readable medium include a read only memory (ROM), a random access memory (RAM), a compact disc (CD)-ROM, a magnetic tape, a floppy disk, and an optical data storage. Furthermore, the computer-readable recording medium may be distributed over a computer system connected to a network, so that computer-readable code may be stored therein and executed therefrom in a decentralized manner. Functional programs, code, and code segments for implementing telematics control method may be easily derived by programmers skilled in the art.

The vehicle charging apparatus, the current stabilization method thereof, and the recording medium in which a program for implementing the method is recorded, according to exemplary embodiments, overcome an unstable phenomenon of current control caused by a system impedance and achieve stable current control performance by adjusting the current control bandwidth of the power factor corrector without changing a circuit configuration of an OBC. Accordingly, when at least one of overcurrent or overvoltage occurs in the power factor corrector in a plurality of unspecified countries or regions, the vehicle battery can be stably charged, so that user may conveniently charge the battery and power source quality of a vehicle may be improved by securing current control stability without raising manufacturing costs and without reducing efficiency.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A current stabilization method performed by a vehicle charging apparatus, which includes a power factor corrector for correcting a power factor of an alternating current (AC) power source, the vehicle charging apparatus converting an AC voltage of the AC power source into a direct current (DC) voltage to charge a battery, the method comprising:
    determining whether adjusting of a current control bandwidth of the power factor corrector is requested;
    downwardly-adjusting the current control bandwidth of the power factor corrector when the adjusting of the current control bandwidth of the power factor corrector is requested; and
    operating the power factor corrector using the downwardly-adjusted current control bandwidth,
    wherein the determining comprises:
        determining whether overcurrent has occurred in the power factor corrector;
        determining a number of occurrences of the overcurrent; and
        determining whether the determined number of the occurrences of the overcurrent is equal to or greater than a first predetermined number of the occurrences, and
    wherein, when the determined number of the occurrences of the overcurrent is equal to or greater than the first predetermined number of occurrences, the current control bandwidth is downwardly-adjusted.

2. The current stabilization method of claim 1, wherein the determining of whether the adjusting of the current control bandwidth of the power factor corrector is requested further comprises:
    determining whether the determined number of the occurrences of the overcurrent is equal to or greater than a second predetermined number of the occurrences when the determined number of the occurrences of the overcurrent is equal to or greater than the first predetermined number of occurrences, the current control bandwidth being downwardly-adjusted when the determined number of the occurrences of the overcurrent is less than the second predetermined number of occurrences, and
    wherein the second predetermined number of the occurrences is greater than the first predetermined number of occurrences.

3. The current stabilization method of claim 2, further including stopping an operation of the power factor corrector and initializing the current control bandwidth, when the determined number of the occurrences of the overcurrent is equal to or greater than the second predetermined number of occurrences.

4. The current stabilization method of claim 2, further including:
    determining whether charging of the battery is completed; and
    stopping an operation of the power factor corrector and initializing the current control bandwidth, when the charging of the battery is completed.

5. The current stabilization method of claim 1, wherein the downwardly-adjusting the current control bandwidth includes downwardly-adjusting the current control bandwidth using the determined number of the occurrences of the overcurrent as follows:

$$ABW=IBW-(C1-X+1)\cdot\alpha$$

wherein ABW denotes the downwardly-adjusted current control bandwidth, IBW denotes an initial current control bandwidth, C1 denotes the determined number of the occurrences of the overcurrent, X denotes the first predetermined number of occurrences, and $\alpha$ denotes an amount of downward adjustment of the current control bandwidth.

6. The current stabilization method of claim 5, wherein the $\alpha$ is 10 Hz to 2000 Hz.

7. The current stabilization method of claim 1, wherein the determining of whether the adjusting of the current control bandwidth of the power factor corrector is requested further comprises:
    determining a duration in which the overcurrent does not occur after the overcurrent has occurred; and
    reducing the determined number of the occurrences of the overcurrent when the duration is equal to or greater than a predetermined duration.

8. The current stabilization method of claim 7, wherein the downwardly-adjusting the current control bandwidth includes downwardly-adjusting the current control bandwidth using the determined number of the occurrences of the overcurrent as follows, when the determined number of the occurrences of the overcurrent is reduced:

$$ABW=IBW-(CM-X+1)\cdot\alpha$$

wherein ABW denotes the downwardly-adjusted current control bandwidth, IBW denotes an initial current control bandwidth, CM denotes a maximum value of the determined number of the occurrences of the overcurrent, X denotes the first predetermined number of occurrences, and α is an amount of downwardly-adjustment of the current control bandwidth.

9. A current stabilization method performed by a vehicle charging apparatus, which includes a power factor corrector for correcting a power factor of an alternating current (AC) power source, the vehicle charging apparatus converting an AC voltage of the AC power source into a direct current (DC) voltage to charge a battery, the method comprising:
determining whether the adjusting of a current control bandwidth of the power factor corrector is requested;
downwardly-adjusting the current control bandwidth of the power factor corrector when the adjusting of the current control bandwidth of the power factor corrector is requested; and
operating the power factor corrector using the downwardly-adjusted current control bandwidth,
wherein the operating of the power factor corrector comprises:
determining whether a current control bandwidth of the power factor corrector at a timing when overcurrent occurs is less than the downwardly-adjusted current control bandwidth;
operating the power factor corrector in the current control bandwidth of a present timing when the current control bandwidth of the present timing is less than the downwardly-adjusted current control bandwidth, the current control bandwidth of the present timing corresponding to the current control bandwidth of the power factor corrector at a timing when the overcurrent occurs; and
operating the power factor corrector in the downwardly-adjusted current control bandwidth when the downwardly-adjusted current control bandwidth is equal to or less than the current control bandwidth of the present timing.

10. A vehicle charging apparatus configured for converting an alternating current (AC) voltage of an AC power source into a direct current (DC) voltage and charging a battery, the vehicle charging apparatus comprising:
an input filter configured to filter the AC voltage supplied from the AC power source and output a filtered result thereof;
a rectifier configured to rectify the filtered result and output the rectified result as a first DC voltage;
a power factor corrector configured to correct a power factor of the vehicle charging apparatus using the first DC voltage in response to a first control signal and output the power factor corrected result as a second DC voltage;
a level converter configured to convert a level of the second DC voltage in response to a second control signal and output the level-converted DC voltage to the battery; and
a controller configured to determine whether adjusting of a current control bandwidth of the power factor corrector is requested, downwardly-adjust the current control bandwidth of the power factor corrector in response to the determined result, generate the first control signal corresponding to the downwardly-adjusted current control bandwidth, and generate the second control signal to control the level converter,
wherein the controller includes:
a first controller configured to generate the first control signal; and
a second controller configured to generate the second control signal,
wherein the first controller includes:
an adjustment determiner configured to determine whether the adjusting of the current control bandwidth of the power factor corrector is requested;
a bandwidth adjuster configured to downwardly-adjust the current control bandwidth of the power factor corrector in response to the determined result thereof; and
an operation controller configured to generate the first control signal corresponding to the downwardly-adjusted current control bandwidth,
wherein the adjustment determiner includes:
a detector configured to detect whether overcurrent has occurred in the power factor corrector;
a number-of-occurrences counter configured to determine a number of occurrences of the overcurrent according to a detected result in the detector; and
a first comparator configured to compare a number of the occurrences of the overcurrent determined in the number-of-the occurrences counter with a first predetermined number of the occurrences,
wherein the bandwidth adjuster downwardly-adjusts the current control bandwidth in response to a compared result in the first comparator.

11. The vehicle charging apparatus of claim 10, wherein the adjustment determiner further includes a second comparator configured to compare the determined number of the occurrences of the overcurrent in the number-of-the occurrences counter with a second predetermined number of the occurrences in response to the compared result in the first comparator,
wherein the second predetermined number of the occurrences is greater than the first predetermined number of the occurrences,
wherein the bandwidth adjuster downwardly-adjusts the current control bandwidth in response to the compared results in the first and second comparators, and
wherein the operation controller generates the first control signal in response to the compared result in the second comparator.

12. The vehicle charging apparatus of claim 11, wherein the adjustment determiner further includes:
a duration counter configured to count a duration in which the overcurrent does not occur after the overcurrent has occurred through the detected result in the detector; and
a third comparator configured to compare the duration counted in the duration counter with a predetermined duration, and
wherein the number-of-the occurrences counter reduces the determined number of the occurrences of the overcurrent in response to the compared result in the third comparator.

13. The vehicle charging apparatus of claim 12, wherein the bandwidth adjuster downwardly-adjusts the current control bandwidth using one of the following two equations in response to the compared results in the first, second and third comparators:

$$ABW = IBW - (C1 - X + 1) \cdot \alpha$$

or $$ABW = IBW - (CM - X + 1) \cdot \alpha$$

wherein ABW denotes the downwardly-adjusted current control bandwidth, IBW denotes an initial current control bandwidth, C1 denotes the determined number of the occurrences of the overcurrent in the number-of-the occurrences counter, CM denotes a maximum value of the determined number of the occurrences of the overcurrent in the number-of-the occurrences counter, X denotes the first predetermined number of the occurrences, and $\alpha$ denotes an amount of downward adjustment of the current control bandwidth.

* * * * *